United States Patent [19]

Alfano et al.

[11] Patent Number: 5,142,372
[45] Date of Patent: Aug. 25, 1992

[54] THREE-DIMENSIONAL OPTICAL IMAGING OF SEMI-TRANSPARENT AND OPAQUE OBJECTS USING ULTRASHORT LIGHT PULSES, A STREAK CAMERA AND A COHERENT FIBER BUNDLE

[76] Inventors: Robert R. Alfano, 3777 Independence Ave., Bronx, N.Y. 10463; Ping-Pei Ho, 240-42 69th Ave., Douglaston, N.Y. 11362

[21] Appl. No.: 489,941

[22] Filed: Mar. 8, 1990

[51] Int. Cl.$^5$ ............................................. H04N 7/18
[52] U.S. Cl. ..................... 358/209; 358/88; 358/217; 358/903
[58] Field of Search .................... 358/88, 89, 209, 217, 358/903

[56] References Cited

U.S. PATENT DOCUMENTS 4,704,634 11/1987 Kato .................................. 358/217
4,791,490 12/1988 Knight .............................. 358/217

*Primary Examiner*—Howard W. Britton
*Attorney, Agent, or Firm*—Irving M. Kriegsman

[57] ABSTRACT

An apparatus for producing a 3-dimensional image of semi-transparent object or of a opaque object in a semi-transparent media includes a picosecond or a femtosecond laser, a streak camera, a coherent fiber bundle, a video camera and a computer. The apparatus provides a unique nondestructive and non-invasive diagnostic way for detecting, for example, objects hidden in semi-opaque media. The laser is used to produce an ultrashort light pulse. The coherent fiber bundle is used to convert the 2-dim spatial image that is produced (i.e. scattered or fluorescence light from a 3-dim object illuminated with the ultrashort laser pulse) into a 1-dim line image which is fed into the input slit of the streak camera and then time resolved by the streak camera. The video camera is used to record the 2-dim output (1-dim from input image and 1-dim of the streak time) from the streak camera. The output of the video camera is fed into the computer. In the computer 2-dim data elements are reconstructed into a 3-dim image and then displayed on a monitor. This apparatus essentially converts a streak camera into the equivalent of a framing camera with continuous time imaging capability.

18 Claims, 3 Drawing Sheets

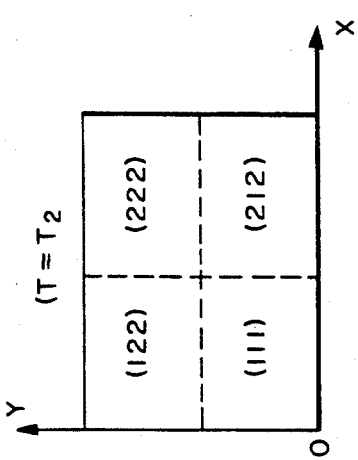
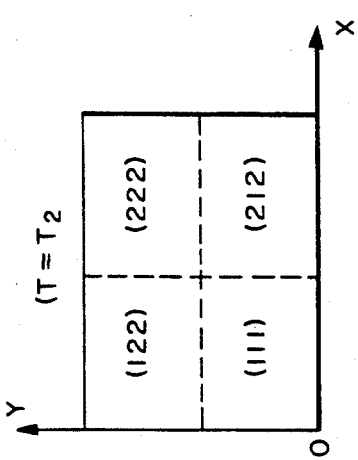
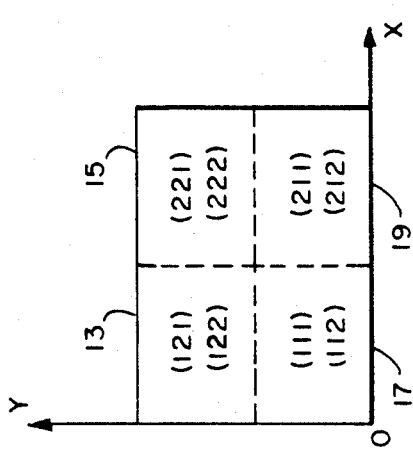
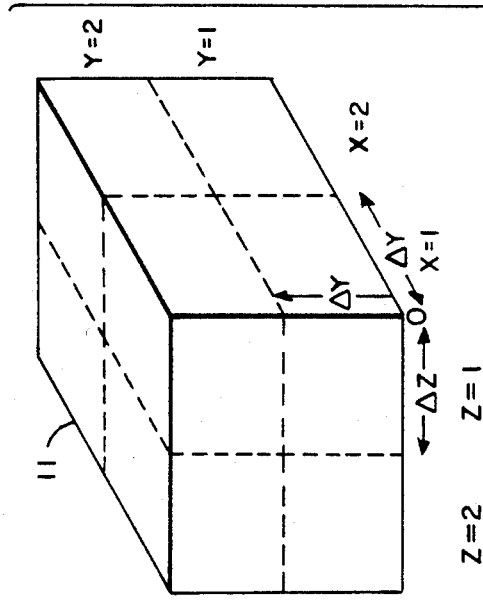

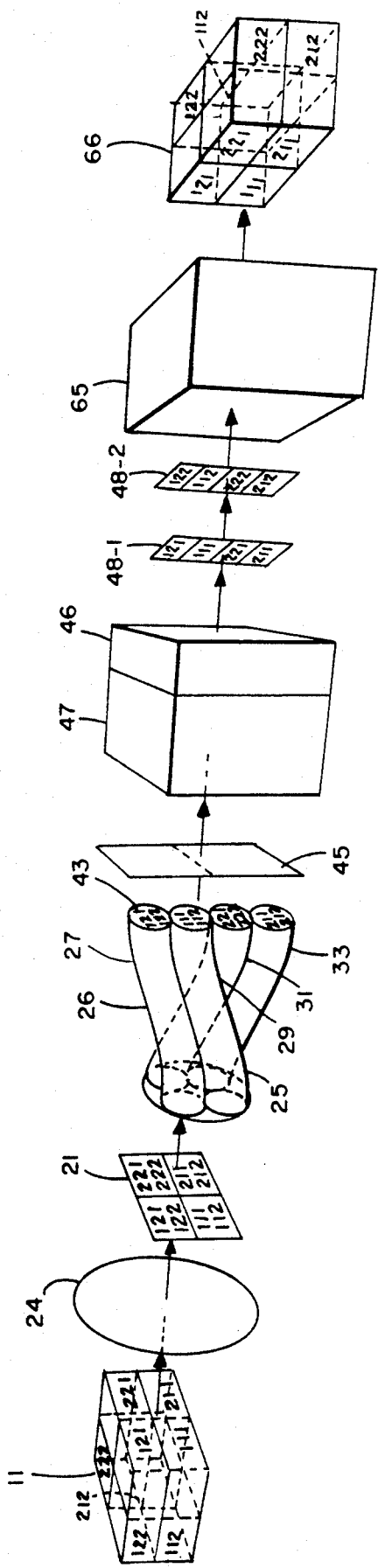
FIG. 5
FIG. 8
FIG. 7

THREE-DIMENSIONAL OPTICAL IMAGING OF SEMI-TRANSPARENT AND OPAQUE OBJECTS USING ULTRASHORT LIGHT PULSES, A STREAK CAMERA AND A COHERENT FIBER BUNDLE

BACKGROUND OF THE INVENTION

The present invention relates generally to three-dimensional optical imaging of semi-transparent and opaque objects and more particularly to three-dimensional optical imaging of semi-transparent and opaque objects using ultrashort light pulses, a streak camera and a coherent optical fiber bundle.

In conventional photography, 2 dimensional (2-dim) images are obtained from three-dimensional (3-dim) objects. In holography, 3 dimensional (3-dim) as opposed to 2-dim images have been produced from 3-dim objects. A framing camera takes a sequence of images over a time interval. However, holography and framing cameras have intrinsic problems which prevent their usage in situations where high spatial resolution images are to be displayed.

In holography, 3-dim images are obtained from the interference of light waves. In order to record an undistorted holographic image, the spatial resolution of the holographic recording material should be better than 1000 lines/mm. This spatial resolution requirement cannot be met with the current electronic video technology wherein the spatial resolution is about 100 lines/mm.

A framing camera produces a series of frames. The series of frames do not constitute a continuous image. A framing camera having an electronic type of time shutter is limited to from about hundreds of picoseconds per frame to about hundreds of nanoseconds per frame. The shutter time from the fastest framing camera will transfer to a few centimeter image spatial resolution which is not satisfactory for high quality image recording and displaying. A framing camera having an optical Kerr shutter requires multiple shots to segment multiple planes of a 3-D object.

Thus, the need clearly exists for a new and improved technique for making 3-dim images of 3-dim objects and, in particular, for making 3-dim images corresponding to surface shape and inner structure of 3-dim semi-transparent objects or the surface shape of 3-dim opaque objects.

The following is a list of known references:

T. A. Shankoff, Applied Optics 7 2101 (1968)

H. Smith "Holographic Recording Materials", Springer Verlag, N.Y. (1978)

T. Y. Yang, P. P. Ho, A. Katz, R. Alfano, R. Ferrante, Applied Opt. 24 2021 (1985)

P. Ho, "Ultrafast Kerr Gate" ch. 25, in "Ultrafast Processes in Semiconductors" ed. by R. Alfano, Academic Press, New York (1984)

Y. Takiguchi, K. Kinoshita, M. Suyama, Y. Inagaki, and Y. Tsuchiya, SPIE Proceeding volume 693 pp. 105–110 (1986)

Y. Takiguchi, S. Aoshima, and Y. Tsuchiya, SPIE Proceeding v. 693 pp. 118–124 (1986)

It is an object of this invention to provide a new and improved technique for producing a 3-dim image of a 3-dim semi-transparent object or a 3-dim opaque object.

It is another object of this invention to provide a technique for converting a 1-dim image into a 3-dim image.

It is still another object of this invention to provide a technique for converting a streak camera into the equivalent of a framing camera that is continuous in time.

SUMMARY OF THE INVENTION

According to this invention, a technique is provided which can measure the 3-dim image of a semi-transparent object or of an apaque object in a transparent or semi-transparent media. The technique involves using a picosecond or femtosecond laser, a streak camera, a coherent fiber bundle, a video camera and a computer. The technique provides a unique nondestructive and non-invasive diagnostic method to determine, for example, hidden objects such as tumors in human organs. The laser is used to illuminate the 3-dim object. The coherent fiber bundle is used to convert a the 2-dim spatial image produced from the 3-dim object when illuminated with an ultrashort light pulse from the picosecond or femtosecond laser into a 1-dim line image which is then time resolved by the streak camera. The (2-dim) video camera records the 2-dim output (1-dim from input image and 1-dim of the streak time) from the streak camera. In the computer, the 2-dim data elements from the video camera are reconstructed into a 3-dim image from the time sequence of data.

The present invention essentially converts a streak camera into the equivalent of a framing camera with continuous time imaging capability.

Various features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is a perspective view of a 3-dim object;

FIG. 2 is a 2-dim stacked image of the 3-dim object shown in FIG. 1, photographed in 3-dim;

FIG. 3 is a time resolved 3-dim image of the 3-dim object shown in FIG. 1 at time T=T1;

FIG. 4 is a time resolved 3-dim image of the 3-dim object shown in FIG. 1 at time T=T2;

FIG. 5 is a schematic of 3-dim image formation and restoration according to this invention;

FIG. 7 is an end view of the input end of the coherent fiber bundle shown in FIG. 6; and FIG. 8 is an end view of the output end of the coherent fiber bundle shown in FIG. 6.

DETAILED DESCRIPTION OF PREFERRED EMBODIMENTS

Figure 6:
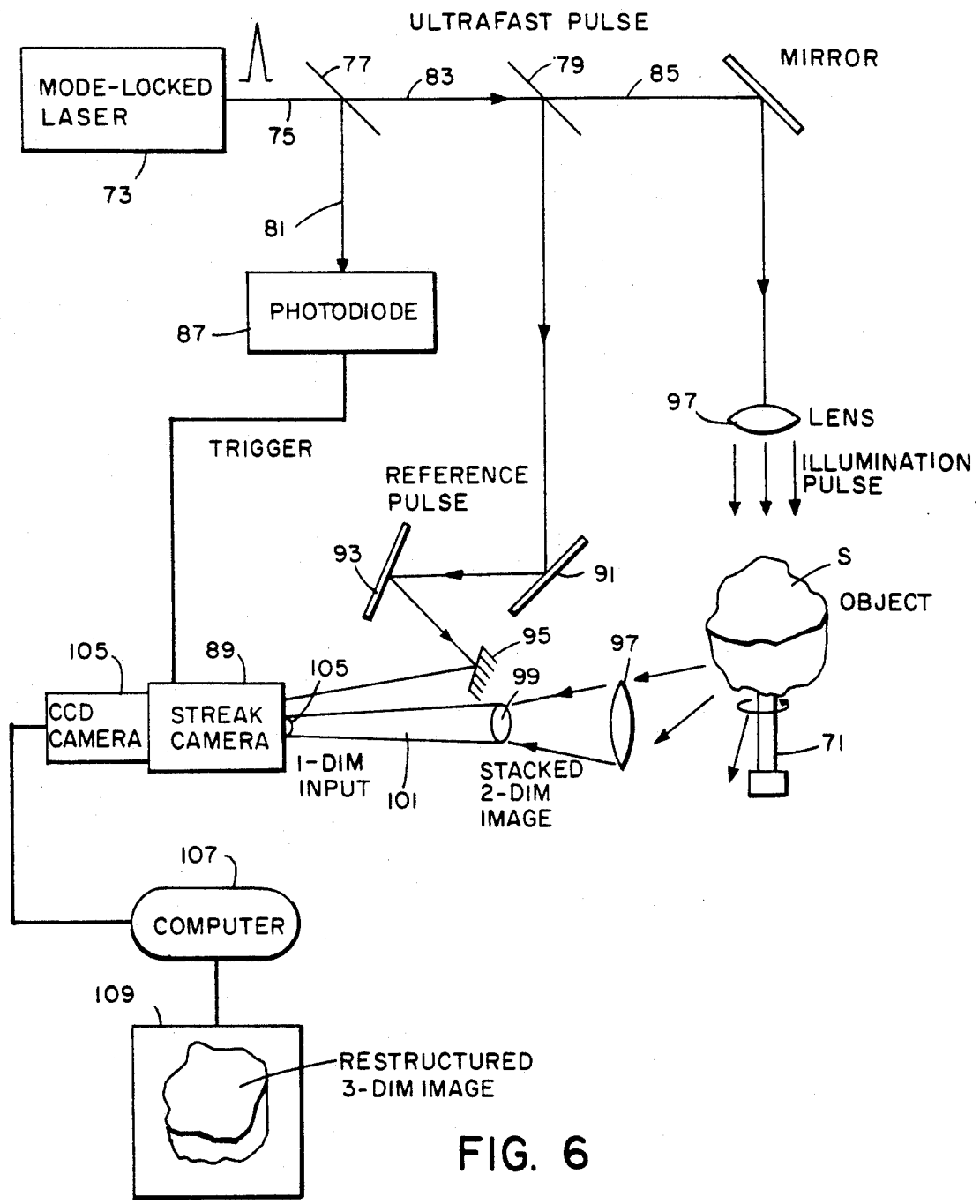
FIG. 6 is a schematic of an apparatus for producing a 3-dim image of a 3-dim object constructed according to this invention.

In time resolved imaging, such as in a framing camera, an extra dimension, namely, time, is incorporated into conventional 2-dim photography to achieve 3-dim imaging. This is illustrated in FIGS. 1-3.

Referring now to FIG. 1 there is shown a cubic shaped object 11. Object 11 can be broken down into eight compartments compartments i, j, k where i, j, k are equal to 1 or 2 respectively and where the x-y plane represents the conventional 2-dim photographic image plane and the z axis represents the depth (or time of flight, $t = z/c$) of the object.

Using a regular lens for a 2-dim photography, these eight compartments can be recorded and displayed on the x-y plane as shown in FIG. 2 in four blocks labelled 13, 15, 17 and 19. The depth (z-axis) information cannot be resolved in 2-dim imaging. For example, elements (121) and (122) overlap in the same block (13) for a 2-dim measurement. At any given block on the 2-dim image (i, j), information from these two compartments (i, j, 1) and (i, j, 2) are lumped together.

In time-resolved 3-dim imaging which based on the time flight, $T = z/c$, the missing z-axis (depth) information is resolved by taking pictures at different times. Two sets of 2-dim images at time $= T_1$ and $T_2$ so obtained are shown in FIGS. 3 and 4. In this manner, total information of the object which consists of the eight compartments can be resolved using the time dimension.

According to one aspect of this invention, a streak camera is used instead of a framing camera for producing time resolved images.

As is known, the time resolution of a streak camera can be as fast as 0.3-ps which gives a spatial resolution 0.1-mm. However, a streak camera can only receive a 1-dim line source input and not 3-dim image.

In order to solve this problem and as shown in a partially exploded schematic in FIG. 5, a set of stacked images 21 of object 11 are formed by a lens 25, on the input end 24 of a coherent fiber bundle 26. The fibers 27, 29, 31 and 33 are arranged at the input end 23 in a 2-dim (x, y) array.

At the output end 43 of coherent fiber bundle 26, the fibers are arranged in a 1-dim array in a known sequence. As can be seen, fiber 27 is at one end, fiber 29 is next to it and so forth. The 1-dim array in known sequence is fed into the input slit 45 of a streak camera 47. As can be appreciated, the output of the fiber bundle 25 comprises a 1-dim line source which contains the 2-dim spatial image and which matches the input requirements of streak camera 47. In streak camera 47, the depth information (z-axis) is separated into separate 2-dim streak output images for each fiber. The streaked images 48-1 and 48-2 so formed have all of the 3-dim spatial information. The horizontal axis (time) is the z-axis and the vertical axis includes both x- and y-axis information of a 2-dim image corresponding to a well defined coherent line. After recording the 2-dim streak images using a 2-dim CCD camera 64, a computer 65 reforms the image of a line (vertical axis) into a 2-dim image. The finalized 3-dim image 66 is shown on a display (not shown). That is, computer 65 matches point for point of coherent fiber bundle 25 and converts the 2-dim data into a 3-dim image sequence. The line sequence data is reconverted to 2-dim images which also changes in time. This is similar to a 2-dim movie except that the time scale to record each 2-dim frame image is in the order to $10^{-12}$ seconds. Each data column (vertical axis) is mapped into the x-y plane image and the data row of the 2-dim data will be assigned as the z- (or time) axis.

As can be appreciated, the resolution of the 3-dim image so formed depends on the number of fibers and the number of pixels of the video camera. The restructured 3-dim image is identified by reference numeral 67.

Referring now to FIG. 6 there is shown an apparatus 69 constructed according to the teachings of the present invention for producing a 3-dim image of a 3-dim object S made of semi-transparent material. Object S is mounted on a holder 71 which is translatable and rotatable so that objects can be turned or moved relative to the light beam, when so desired.

Apparatus 69 includes a mode locked laser 73 for producing a beam 75 of ultrashort light pulses. As is known, a mode locked laser can produce ultrashort light pulses with wavelengths controllable from near ultraviolet to infrared with durations from about 30 femtoseconds to about 10 picoseconds. A pair of beamsplitters 77 and 79 split beam 75 into three parts 81, 83, 85.

One part 81 is directed onto a photodiode 87. The output of photodiode 87 is used as a trigger signal to trigger the deflection circuitry in a synchroscan streak camera 89. The temporal resolution of streak camera 89 is 2 ps ($Z \sim 0.5$ mm) for a single shot and 10 ps ($Z \sim 2$ mm for $= 1.5$) for the sync-scan mode. The spatial resolution for the sync-scan mode is better than 3 mm which renders the apparatus extremely useful for diagnostic applications. Another part 83 of beam 75 is deflected off of three mirrors 91, 93 and 95 and directed into the slit (not shown) in streak camera 89 for use as a reference pulse. Mirror 95 is movable in the direction shown by arrows B so that the path length can be varied. The third part of 85 of beam 75 is passed through a beam expander lens system 97 and then illuminates object S.

Light scattered from objects S, and shown by arrows C, is imaged by an imaging lens 97 onto the input end 99 of a coherent fiber bundle 101. At input end 99 the fibers are arranged in a 2-dim x-y array. An end view of input end 99 is shown in FIG. 7 with the fibers being labelled 103-1 through 103-9 and the number of fibers shown being for illustrative purposes only. At the output end 105 of fiber bundle 101 the fibers are arranged in sequence in a 1-dim line, as shown in FIG. 8. This corresponds to the input slit of streak camera 89. In streak camera 89 a separate streak image is formed on the phosphor screen at the output end from the light from each fiber.

The images on the phosphor screen of streak camera 89 are recorded in video camera 105. The data from video camera 105 is fed into a computer 107 where the data is processed to reconstruct the 3-dim image. The image so formed is displayed on display 109.

The overall time resolution (spatial resolution $= n\, t/c$) is a convolution of the illumination pulse duration, the streak camera resolution, collection optics error, and dispersion of the fiber. For example, the best spatial resolution for the image using a 30-fs laser pulse and 2-ps streak camera is 0.5-mm. The worst combination using 10-ps laser pulse, 10-ps streak camera, plus 2-ps dispersion in a 50 cm long fiber is about 3-mm. The spatial resolution of a 3-dim image using this invention is about 100 times better than that of a framing camera approach.

If the object being imaged is opaque rather than semi-transparent, then holder 79 is rotated so that images can be obtained from all sides.

As can be appreciated, the invention is useful in detecting defects in semiconductor crystals, diseased tissues in human organs, objects in semi-opaque media and objects in turbal media. The invention is useful in measuring the time sequence of an image of an event such as a moving bullet, changing molecular processes, or biological or medical motions.

The embodiments of the present invention described above are intended to be merely exemplary and those skilled in the art shall be able to make numerous variations and modifications without departing from the spirit of the present invention. All such variations and modifications are intended to be without the scope of the present invention as defined in the appended claims.

What is claimed is:

1. Apparatus for producing a 3-dim image of a semi-transparent object or of an opaque object in a transparent or semi-transparent media comprising:
   a. means for illuminating the object with an ultrafast pulse of light,
   b. a coherent fiber bundle, the coherent fiber bundle having an input end and an output end, the input end being in a 2-dim configuration and the output end being in a 1-dim configuration,
   c. means for imaging the light pulse scattered from the object and/or fluorescence from the object onto the input end of the fiber optic bundle,
   d. a streak camera having an input and an output, the input end having a slit, the output of the fiber optic bundle being coupled to the slit,
   e. means for converting the image formed at the output of the streak camera into data elements,
   f. a computer for reconstructing a 3-dim image from the data elements, and
   g. means for displaying the image so constructed.

2. The apparatus of claim 1 and wherein the means for illuminating the object comprises a laser.

3. The apparatus of claim 1 and wherein the means for imaging the light pulse scattered from the object comprises a lens.

4. The apparatus of claim 1 and wherein the fibers are in an array of up to about 1000 by 1000 fibers at the input end.

5. The apparatus of claim 1 and wherein the fibers in the coherent fiber bundle are in a 10 by 20 fiber area array at the input end and a 200 fiber linear array at the output end.

6. A method for producing a 3-dim image of a semi-transparent object or of an opaque object in a transparent or semi-transparent media comprising:
   a. illuminating the object with an ultrafast pulse of light,
   b. forming a 2-dim image of the light pulse scattered from the object,
   c. time resolving 2-dim image, and
   d. producing a 3-dim image from the time resolved 2-dim image.

7. Apparatus for producing a 3-dim image of a semi-transparent object or of an opaque object in a transparent or semi-transparent media comprising:
   a. means for illuminating the object with an ultrafast pulse of light,
   b. means for forming a 2-dim image of the light pulse scattered from the object,
   c. means for time resolving the 2-dim image, and
   d. means for reconstructing a 3-dim image from the 2-dim image.

8. A method of making a 3-dim image of a 3-dim object comprising:
   a. providing a coherent fiber bundle having an input end in a 2-dim configuration and an output end in a 1-dim configuration;
   b. imaging light scattered from the object onto the input of the fiber bundle;
   c. forming a series of streak images corresponding to the images at the output end of the fiber bundle, each streak image corresponding to the image of one fiber in the fiber bundle;
   d. converting the streak images into electrical signals; and
   e. forming a 3-dim image using said electrical signals.

9. Apparatus for producing a 3-dim image of a semi-transparent object or of an opaque object in a transparent or semi-transparent media
   a. means for illuminating the object with a beam of light,
   b. means for imaging light scattered from the object;
   c. a streak camera for providing a continuous image of the imaged so formed.

10. The apparatus of claim 9 and further including a fiber bundle consisting of fibers of about 10 microns for imaging the image of the object into the input slit of the streak camera.

11. A method of making a 3-dim image of a 3-dim object comprising illuminating the object and then using a streak camera to form a continuous image of the object in time using light scattered from the object.

12. Apparatus for making a 3-dim image of a 3-dim object comprising:
   a. means for illuminating the object with a pulse of light,
   b. a lens positioned to focus light scattered from the object into a 2-dim spatial image;
   c. a fiber bundle for converting the 2-dim spatial image from the lens into a 1-dim line image; and
   d. a streak camera for producing a series of streak images, one from each fiber in the bundle.

13. The apparatus of claim 12 and further including a video camera coupled to the output of the streak camera and a computer coupled to the output of the video camera for mapping the image.

14. The apparatus of claim 13 and further including a display for displaying the 3-dim image restructured by the computer.

15. A method of making a 3-dim image of a 3-dim object which comprises:
   a. forming a 2-dim image of the 3-dim object using scattered light;
   b. using a fiber bundle to convert a 2-dim image into a 1-dim line of images for use with a streak camera;
   c. time resolving the 1-dim line of images in a streak camera.

16. Apparatus for producing a 3-dim image of an object comprising:
   a. means for producing an ultrafast pulse of light,
   b. means for splitting the ultrafast pulse of light into first, second and third parts;
   c. means for illuminating said object with said first part of said pulse of light;
   d. a coherent fiber bundle, the coherent fiber bundle having an input end and an output end, the input end being in a 2-dim configuration and the output end being in a 1-dim configuration;
   e. means for imaging the light scattered from the object and/or fluorescence from the object onto the input end of the fiber optic bundle;

f. a streak camera having an input an output and deflection circuitry, the input having a slit, the output of the fiber optic bundle being coupled to the slit, g. means for directing said second part of said pulse of light into said input of said streak camera for use as a reference signal;

h. trigger means for converting said third pulse part into a trigger signal for triggering said deflection circuitry in said streak camera. and i. means for converting the image formed at the output of the streak camera into a 3-dim image.

17. The apparatus of claim 16 and further including expander means for expanding said first pulse part.

18. The apparatus of claim 17 and further including rotatable support means for holding said object.

* * * * *